United States Patent [19]

Jansen et al.

[11] Patent Number: 5,749,941
[45] Date of Patent: May 12, 1998

[54] METHOD FOR GAS ABSORPTION ACROSS A MEMBRANE

[75] Inventors: Albert Edward Jansen, Houten; Paul Hubert Maria Feron, Zeist, both of Netherlands

[73] Assignee: Nederlandse Organisatie voor Toegepast-Natuurwetenschappelijk Onderzoek TNO, Delft, Netherlands

[21] Appl. No.: 716,159

[22] PCT Filed: Mar. 24, 1995

[86] PCT No.: PCT/NL95/00116

§ 371 Date: Sep. 17, 1996

§ 102(e) Date: Sep. 17, 1996

[87] PCT Pub. No.: WO95/26225

PCT Pub. Date: Oct. 5, 1995

[30] Foreign Application Priority Data

Mar. 25, 1994 [NL] Netherlands .................... 9400483
Jul. 27, 1994 [NL] Netherlands .................... 9401233

[51] Int. Cl.$^6$ ............................ B01D 53/22; B01D 53/14
[52] U.S. Cl. ........................ 95/44; 95/49; 95/51; 96/5; 96/8
[58] Field of Search ........................ 95/44, 49, 51; 96/4, 5, 8, 10

[56] References Cited

U.S. PATENT DOCUMENTS

| | | | |
|---|---|---|---|
| 1,945,163 | 1/1934 | Rosenstein et al. | |
| 3,910,780 | 10/1975 | Henley et al. | 55/158 |
| 4,115,514 | 9/1978 | Ward, III | 95/44 X |
| 4,147,754 | 4/1979 | Ward, III | 423/224 |
| 4,174,374 | 11/1979 | Matson | 95/44 X |
| 4,187,086 | 2/1980 | Walmet et al. | 95/44 |
| 4,268,279 | 5/1981 | Shindo et al. | 55/16 |
| 4,609,383 | 9/1986 | Bonaventura et al. | 96/4 X |
| 4,750,918 | 6/1988 | Sirkar | 95/44 |
| 4,834,779 | 5/1989 | Paganessi et al. | 95/51 X |
| 4,900,448 | 2/1990 | Bonne et al. | 95/44 |
| 4,912,051 | 3/1990 | Zaromb | 96/4 X |
| 4,913,818 | 4/1990 | Van Wijk et al. | 96/4 |
| 4,954,145 | 9/1990 | Thakore et al. | 55/16 |
| 5,135,547 | 8/1992 | Tsou et al. | 95/44 |
| 5,271,842 | 12/1993 | Degen et al. | 96/4 X |
| 5,281,254 | 1/1994 | Birbara et al. | 95/44 |
| 5,445,669 | 8/1995 | Nakabayashi et al. | 95/44 X |
| 5,611,842 | 3/1997 | Friesen et al. | 95/45 X |
| 5,611,843 | 3/1997 | Ho | 95/51 |

FOREIGN PATENT DOCUMENTS 0 451 715 10/1991 European Pat. Off.
WO91/15284 10/1991 WIPO.
WO94/01204 1/1994 WIPO.

OTHER PUBLICATIONS

Rangwala, "Absorption of Carbon Dioxide into Aqueous Solution Using Hollow Fiber Membrane Contactors", Journal of Membrane Science, 112 (1996), pp. 229–240.

Li et al., "An Ultrathin Skinned Hollow Fibre Module for Gas Absorption at Elevated Pressures", Trans IChemE, vol. 74, part A, Nov. 1996, pp. 857–862.

O. Falk–Pedersen et al., "Separation of Carbon Dioxide from Offshore Gas Turbine Exhaust", Energy Convers. Mgmt. vol. 38 Suppl., pp. S81–S86, 1997.

Guha et al., "Gas Separation Modes In A Hollow Fiber Contained Liquid Membrane Permeator", Ind. Eng. Chem. Res vol. 31, No. 2, pp. 593–605, 1992.

Guha et al., "A Larger–Scale Study of Gas Separation by Hollow–Fiber–Contained Liquid Membrane Permeator", Journal of Membrane Science, 62 (1991) pp. 293–307.

Matsumoto et al., "Fundamental Study on $CO_2$ Removal From the Flue Gas of Thermal Power Plant by Hollow–Fiber Gas–Liquid Contactor", undated.

*Primary Examiner*—Robert Spitzer
*Attorney, Agent, or Firm*—Browdy and Neimark

[57] ABSTRACT

The invention relates to a method for the absorption of one or more gaseous components from a gas phase, in that the gas phase with the component(s) to be absorbed present therein is brought into contact with a liquid phase, wherein the gas phase and the liquid phase are separated by a hydrophobic membrane of a material other than polytetrafluoroethene, wherein the liquid phase comprises water and a water-miscible and/or water-soluble absorbent, and wherein the liquid phase does not give rise to any leakage from the membrane or is effective in preventing or counteracting leakage from the membrane. According to a first preferred aspect, the liquid phase comprises water and a water-miscible and/or water-soluble organic absorbent, wherein the surface tension at 20° C. has been brought to at least $60 \times 10^{-3}$ N/m by adding a water-soluble salt. According to a second preferred aspect, the liquid phase comprises an aqueous solution of a water-soluble amino acid or a salt thereof, such as taurine and derivatives. According to a third preferred aspect, the liquid phase comprises an aqueous solution of a water-soluble phosphate salt. The membranes are preferably in the form of hollow fibres of, for example, polypropene or polyethene. The method is suitable in particular for the absorption of carbon dioxide.

23 Claims, No Drawings

5,749,941

METHOD FOR GAS ABSORPTION ACROSS A MEMBRANE

FIELD OF THE INVENTION

The invention relates to a method for the absorption of one or more gaseous components from a gas phase, in that the gas phase with the component(s) to be absorbed present therein is brought into contact with a liquid phase, wherein the gas phase and the liquid phase are separated by a hydrophobic membrane of a material other than polytetrafluoroethene, and wherein the liquid phase comprises water and a water-miscible and/or water-soluble absorbent.

BACKGROUND OF THE INVENTION

A method of this type was disclosed in the now withdrawn European patent application 0 451 715 (H. Matsumoto et al.) in the name of Mitsubishi, claiming a Japanese priority from 1990. The reference describes an apparatus for separating polar gases from a gas source, in which said gas source containing the polar gas(es) is led through an encased module of porous hollow membrane filaments made of hydrophobic material and having innumerable micropores penetrating through the wall of the hollow filament and distributed over the wall of the hollow filament for effecting gas/liquid mass transfer to an absorption liquid flowing on the other side of the hollow filaments of the module. Although this reference is preferably directed to an apparatus for carrying out said method, it is also described that as the absorption liquid "diethanolamine, aqueous solutions of $K_2CO_3$ and $KHCO_3.H_2O$ and mixtures thereof" can be used. However, this reference is silent with respect to the parameters for carrying out this process, including the concentrations of the components in the absorption liquor, and the surface tension of the final solution.

In a 1994 article from the inventors of EP-A-0 415 715 entitled "Fundamental Study on $CO_2$ Removal from the Flue Gas of Thermal Power Plant by Hollow-Fibre Gas Liquid Contactor", Mitsubishi Heavy Industries Ltd and Tokyo Electric Power Company, presented at $CO_2$ Chemistry Workshop, Hemavan, Sweden, 19–23 Sep. 1993, results are given for the absorption from carbon dioxide from the flue gas from power stations with the aid of hollow fibre membranes, the liquid phase used being a solution of monoethanol amine in water.

In this article, a comparison is given of polypropene (PP), polyethene (PE) and polytetrafluoroethene (PTFE) hollow fibres, from which it can be seen that with polypropene and polyethene membranes the mass transfer coefficient decreases after some time in the case of continuous use. Consequently, using these membranes it is not possible to operate gas/liquid absorption under stable conditions over a prolonged period. Therefore, in this article preference is given to PTFE hollow fibre membranes.

However, the PTFE membranes used have an appreciably lower mass transfer coefficient than the polypropene and polyethene membranes. Moreover, PTFE is very difficult to process. For example, hollow fibres with small external diameters (<0.72 mm) which are desirable for use in compact equipment for, for example, the 'offshore' industry and aerospace, cannot be produced from PTFE.

As it can be seen from the above two citations, the inventors/authors thereof, despite the four years lying between these references, were unable to satisfactorily perform gas/liquid absorption with polypropene or polyethene hollow fibres, concentrating instead on PTFE fibres, which however have practical disadvantages.

The first aim of the invention is, therefore, to improve the abovementioned gas/liquid absorption methodology, more particularly to provide a method for membrane gas absorption which can be operated under stable conditions over a prolonged period in a system of small dimensions.

A compact system of this type could be provided by the use of, for example, polypropene or polyethene hollow fibres in place of PTFE hollow fibres, in combination with an aqueous solution of a conventional absorbent, such as monoethanolamine.

However, research by the Applicant has now revealed that when an aqueous solution of an organic absorbent customary in the prior art, (such as monoethanolamine/water mixtures) is used with polyethene or polypropene hollow fibre membranes, not only do the abovementioned problems with regard to the reduction in the mass transfer coefficient arise but leakage also occurs, a problem which is not recognised in the above-mentioned prior art.

A second aim of the invention is, therefore, to prevent and/or counteract leakage in membrane gas absorption, in particular with hollow fibre membranes, as a result of which it becomes possible to operate membrane gas absorption under stable conditions for a prolonged period using, for example, polypropene or polyethene hollow fibre membranes.

A third aim of the invention is to provide liquid phases for use in membrane gas absorption, which produce no leakage and/or are effective in preventing and/or counteracting leakage, and which, at the same time, give acceptable or improved characteristics relevant for membrane gas absorption, such as mass transfer, kinetics, regeneration energy and/or corrosiveness, individually and in combination.

A fourth aim of the invention is to provide a system for carrying out membrane gas absorption which has small dimensions, is reliable and does not display any leakage, and nevertheless gives good and rapid removal of the gaseous components to be removed, with which method polypropene and/or polyethene hollow fibres of small dimensions are preferably used.

Further aims of the invention will become apparent from the following description.

The international patent application 9401204 describes a membrane separation process for dehydrating a gas or vapour or liquid mixture by pervaporation, vapour permeation or gas separation, i.e. by using a membrane, for instance in the form of hollow fibres. As the membrane material, polyphenylene oxide and a flat polyvinyl alcohol composite are illustrated, without for instance polyethene or polypropene explicitly being mentioned.

According to this reference the absorption liquid is a highly concentrated solution of one or more hygroscopic salts, with a hygroscopic capacity higher than 50%, preferably higher than 80%, such as brines based on LiBr, CSF, $KC_2H_3O_2$, $MgCl_2$ and mixtures thereof, for example LiBr/$ZnBr_2$/$CaBr_2$. (It is mentioned that sodium chloride or potassium dichromate will not exhibit the desired effect, and carbonates are not mentioned at all.)

Furthermore, although it is mentioned that it was not possible to detect any leakage of brine with a LiBr/$ZnBr_2$/$CHBr_2$ brine and a flat polyvinyl alcohol composite membrane, this reference does not acknowledge the problems of leakage of membranes in general, such as polyethene or polypropene membranes, when used in combinations with aqueous solutions of monoethanol amine as the liquid phase. Also, it gives no indication that such problems could be overcome by adding one or more water-soluble salts in concentrations that are much lower than in the highly concentrated hygroscopic solutions according to this reference.

Finally, this reference only relates to the absorption of water vapour; the absorption of for instance carbon dioxide or hydrogen sulfide is neither mentioned nor suggested.

The international application 9401204 describes a method and device for regulating the humidity of a gas flow and at the same time purifying it of undesired acid or alkaline gases. According to this method a membrane module is used that contains one or more membranes which are microporous and hydrophobic, for instance comprising hollow fibres made of polypropene. As the absorption liquid, again a hygroscopic liquid is used, consisting of polar glycols, alcohols or glycerols such as triethene glycol or polyethene glycol or mixtures thereof, or a hygroscopic liquid consisting of a watery electrolyte solution with hygroscopic qualities, for instance mixtures of these glycols and sodium or potassium carbonate solutions, i.e. in a ratio of 4:1 on a weight basis. These absorption liquids, despite containing a small amount of aqueous carbonate solutions, are therefore of an organic nature, the concentration of the organic absorption component being well over 10M.

However, the use of aqueous solutions of organic amines and water-soluble salts is neither mentioned nor suggested, nor the use thereof in preventing leakage with for instance polypropene or polyethene hollow fibres.

The U.S. Pat. Nos. 5,281,254 and 4,954,145 describe methods for gas absorption using porous membranes, the pores of which are filled with an absorption liquid. These references are related to gas/gas absorption instead of gas/liquid absorption. Also the pores of the membranes are not filled with aqueous solutions, but with, for instance, organic amines.

U.S. Pat. No. 4,147,754 describes the use of "immobilized liquid membranes" in the gas/gas absorption of $H_2S$.

Therefore, none of the abovementioned references is concerned with the problem of leakage of aqueous absorption liquids when used in combination with, for instance, polypropene or polyethene hollow fibres, and no solution for this problem is mentioned or suggested. The present invention for the first time acknowledges this problem, and offers a solution in that the liquid phase is so chosen that the membrane gas absorption can be operated under stable conditions for a prolonged period without leakage occurring.

SUMMARY OF THE INVENTION

To this end the invention provides various liquid phases which absorb the gaseous components to be removed from the gas phase and which produce no leakage from the membrane or are effective in preventing leakage from the membrane. Some of these liquid phases are known per se as liquid phases for gas/liquid absorption, for example in column apparatus.

However, the liquid phases used according to the invention, have not yet been used in membrane gas absorption for the prevention of leakage, a problem which, as has already been mentioned, is also not recognised as such in the prior art.

In the broadest sense, the invention therefore relates to a method of the type described in the preamble, characterised in that a liquid phase is used which does not give rise to any leakage or is effective in preventing or counteracting leakage.

A first preferred aspect of the invention is characterised in that the liquid phase comprises water and a water-soluble or water-miscible organic absorbent, wherein the surface tension of the liquid phase at 20° C. has been brought to at least $60 \times 10^{-1}$ N/m by the addition of a water-soluable salt.

A second preferred aspect of the invention is characterised in that the liquid phase comprises an aqueous solution of a water-soluble amino acid and/or a water-soluble salt of an amino acid.

A third preferred aspect of the invention is characterised in that the liquid phase comprises an aqueous solution of a water-soluble phosphate salt.

Further preferred aspects of the invention and the advantages thereof will become apparent to those skilled in the art from the text which follows.

However, it must be understood that the invention is not restricted to the three preferred aspects but that any liquid phase, preferably aqueous liquid phase, which absorbs the desired gaseous impurity and which is effective with regard to the prevention and/or counteraction of leakage in membrane gas absorption falls under the scope of the invention. On the basis of what is described in the present application, those skilled in the art will be able to determine when leakage occurs and which liquid phases produce no leakage or are effective in preventing and/or counteracting this.

From the standpoint of the further characteristics relevant for membrane gas absorption, such as mass transfer, kinetics and/or regeneration energy, corrosiveness and the like, the three abovementioned liquid phases are, however, to be preferred, as will become apparent from the description below.

In this context, the invention provides several alternative liquid phases, all of which can be used for membrane gas absorption without leakage being obtained. As a result, a person skilled in the art is placed in the position of being able, by the selection of the liquid phase and the further conditions, to provide a membrane gas absorption system which is as optimum as possible for the desired application, further factors, such as the gaseous impurity to be removed, the membrane used, the equipment used, the desired degree of removal, the temperature, the desired mass transfer and kinetics, the method of regeneration and the like, playing a role. In particular and preferably, the liquid phases of the invention will display good kinetics and high mass transfer, which remain constant even in the case of continuous operation over a prolonged period. In particular it is possible, using the liquid phases of the invention, to prevent an undesired reduction in the mass transfer with time, as described in the article by Matsumoto et al. described above, for the use of monoethanolamine/water solutions with polypropene or polyethene hollow fibres.

Furthermore, it is also possible for various elements of the abovementioned preferred aspects to be combined, such combinations falling within the scope of the invention. For instance it is possible, for example, to use a liquid phase which comprises an aqueous solution of both a water-soluble phosphate salt and a water-soluble amino acid or a salt thereof, or, for example, a phosphate salt of a water-soluble amino acid. It is also possible to use a phosphate salt, a water-soluble amino acid or water-soluble salt thereof in order to bring the surface tension, at 20° C., of an aqueous solution of an organic absorbent in water above the value required according to the invention. Further possible combinations will be apparent to those skilled in the art.

Furthermore, the fact that not every liquid phase is equally suitable for every conceivable application also falls within the scope of the invention. A person skilled in the art would, however, be able to select a suitable combination of liquid phase, membrane material and conditions for the desired application from the alternatives offered according to the present application.

The invention is used, in the broadest sense, with membranes which display leakage with known liquid phases, such as, for example, aqueous solutions of conventional organic absorbents.

According to the present Application, leakage must be understood to mean the undesired permeation of the liquid absorbent through the membrane. As a result, the pores of the membrane become filled and/or moistened with the liquid absorbent and in serious cases the essential action of the membrane with regard to keeping the gas phase and the liquid phase separate can be adversely affected.

However, the invention is not restricted to a specific mechanism or a specific explanation for the occurrence of the leakage. The Applicant has found that whether or not leakage occurs is related to various factors in the absorption system, including the membrane used and the liquid phase used.

As a result of the occurrence of this leakage it is possible that the absorbent effect of the membrane system decreases or is even lost completely, the separation efficiency is reduced or the equipment becomes blocked and/or damaged. It can be seen from this that leakage can be a serious problem which can adversely affect the operation and reliability of a membrane gas absorption system, which specifically in applications wherein a high reliability is desired—such as in the offshore industry and aerospace—is highly undesirable.

With conventional liquid absorbents, the leakage which the invention aims to counteract or to prevent occurs in general only after the system has already been in continuous operation for some time—varying from a few hours to several days. This makes the occurrence of this leakage the more surprising, since it would be expected that leakage would occur immediately when the membrane is brought into contact with the liquid absorbent, essentially because the effect of the membrane is insufficient to keep the liquid phase and the gas phase separate.

In practice, however, it has been found that in the case of continuous operation of the absorption unit leakage occurs only after some time, so that it is not possible to predict on the basis of experiments of short duration whether a specific liquid absorbent is effective in preventing or counteracting said leakage. This again shows the importance of the recognition of the problem of the occurrence of leakage, which has led to the present invention.

The occurrence of leakage can be established visually or in any other suitable way, such as will be apparent to those skilled in the art. Once it has been established that a membrane system is displaying leakage, it is then possible to select and use a suitable liquid phase according to the invention.

DETAILED DESCRIPTION OF THE INVENTION

The method and liquid phases of the invention will in general be used with membranes of a material other than polytetrafluoroethene, such as polypropene (PP), polyethene (PE), polyvinylidene fluoride (PVDF) and polysulfone (PSU). Furthermore, the invention can be employed with coated or treated membrane systems, such as plasma membranes, membranes coated with siloxane rubbers (PDMS), membranes treated with fluorine, paraffins and the like, if leakage also occurs.

The membranes can be used in any desired form, such as in the form of flat membranes with transport channels, the so-called "plate and frame" modules (both in co-current and in counter-current, which is to be preferred), or in the form of spirally wound flat membranes, as will be apparent to a person skilled in the art.

With membranes in the form of flat fibres of, for example, polypropene or polyethene, it is possible to achieve the same packing density as is achieved with the polytetrafluoroethene hollow fibres of the prior art. Polypropene and polyether membranes are, however, less expensive and simpler to produce than polytetrafluoroethene hollow fibres.

The invention is, however, preferably and advantageously used for membrane gas absorption with the aid of hollow fibres, more particularly hollow fibres of small diameter, which can be processed to produce and/or be used in equipment of small dimensions.

Hollow fibre membranes of this type, the production and the use thereof are generally known in the specialist field. For instance, U.S. Pat. No. 4,286,279 describes the use of hollow fibre membranes for gas/liquid absorption for use in an artificial lung, but without any mention being made of problems with regard to the stability or leakage of the membrane in the case of continuous use over a prolonged period.

In principle, the use of hollow fibre membranes as contact medium can reduce the dimensions of an absorption device in that large exchange surface areas (>1000 $m^2/m^3$) are achievable with commercially available membranes. Compared with conventional packed columns which usually have a specific surface area of about 100 $m^2/m^3$, this is appreciably greater. As a result, significant reductions in the size of the equipment can be achieved.

In addition, there are additional advantages:

completely free choice of the ratio of gas to liquid flow rates;

no entrainment, flooding or foaming;

low pressure drop on the gas side, low percentage flow surface with membranes;

low liquid hold-up;

counter-current operations readily adjustable with the aid of internally switched segments.

With the method according to the invention, the membranes are therefore preferably hollow fibre membranes produced from an inert porous material other than PTFE. Said hollow fibres advantageously have an external diameter of less than 1 mm, for example 0.33 mm. Such small fibres can at present not be achieved at all with PTFE.

Materials for the production of hollow fibre membranes of this type, such as polypropene (PP), polyethene (PE), polytetrafluoroethene (PTFE), polyvinylidene fluoride (PVDF) and polysulfone (PSU) are known from the prior art. Hollow fibre membranes produced from these materials are often available commercially as replaceable modules, which, for example, comprise sintered fibres with a porosity of 40–70%.

The invention therefore provides a method for the operation of gas/liquid absorption with the aid of hollow fibre membranes, which has a high efficiency, i.e. a high specific surface area and a high mass transfer coefficient and, moreover, in addition no undesired reduction in the mass transfer with time is detected.

The invention also makes it possible to use polypropene and polyethene hollow fibres, which not only have a low cost price but also can have smaller external diameters than the known PTFE fibres. On the basis hereof, the method according to the invention can be operated in compact equipment.

The method of the invention can be used for the removal of multifarious different impurities from gas phases and, in the broadest sense, is not restricted to specific impurities.

For instance, membrane gas absorption is a very suitable technique for the removal of, for example, carbon dioxide from gas phases such as air, flue gases and off-gases, which constitutes a preferred aspect of the invention.

Important aspects when selecting the specific process are, in this context, the $CO_2$ concentration, the desired degree of removal, the degradation by oxygen present in the off-gas, the corrosiveness, the desired purity of the $CO_2$ produced and the prevailing process conditions in the off-gas stream.

Especially for applications such as in the offshore industry and aerospace, small dimensions, a low weight and a high reliability (i.e. stability) of the equipment are important. In addition to the available contact surface area, in this context the kinetics of the process are also a decisive factor in determining the volume taken up by the equipment. In this context, the invention makes it possible for a person skilled in the art to obtain the desired characteristics in the ultimate system without the occurrence of leakage or an undesired reduction in the mass transfer.

By correct choice of the liquid phase, the invention can also be used for the removal of, for example, hydrogen sulfide or water vapour from gas phases. The invention can also be used to prevent leakage in desorption processes where membrane techniques are used, in which case the regeneration energy of the liquid phase can also be an important process parameter.

The invention also relates to a system for membrane gas absorption, comprising a membrane module with hollow fibres of a material other than polytetrafluoroethene and a container, which contains an aqueous liquid phase, wherein the liquid phase does not produce any leakage from the membrane or is effective in preventing or counteracting leakage from the membrane. The invention will be discussed in more detail below with reference to the abovementioned preferred aspects and non-limiting examples.

Finally, it should be understood that the absorption liquids of the classes described in the present application can of course also be used with PTFE membranes, because of their advantageous absorption properties described herein.

A. Combination of an organic solvent and a water-soluble salt

According to the first preferred aspect of the invention, a liquid phase is used which comprises water and a water-soluble or water-miscible organic absorbent, wherein the surface tension of the liquid at 20° C. has been brought to at least $60 \times 10^{-1}$ N/m by the addition of a water-soluble salt.

In this context the water-soluble salt is preferably chosen from water-soluble carbonates, preferably potassium carbonate and sodium carbonate. The salt is advantageously used in a concentration of 0.05–10M, preferably 0.1–5M.

The organic absorbent is preferably chosen from monoethanolamine (MEA), diethanolamine (DEA), methyldiethanolamine (MDEA), methyl ethyl ketone (MEK), methyl isobutyl ketone (MIBK), (poly)ethene glycols, ethers, alcohols and N-methylpyrrolidone, more preferentially from monoethanolamine or diethanolamine.

The organic absorbent is advantageously used in a concentration of 0.05–10M, preferably 0.1–5M.

The invention is, however, not restricted to the above water-soluble salts, organic absorbents and concentrations, and further suitable possibilities will become apparent to those skilled in the art.

As already mentioned above, when combinations of water and the abovementioned organic absorbents are used problems with regard to mass transfer and with regard to leakage are obtained only with, for example, polypropene or polyethene hollow fibres. Surprisingly, it has been found that with the aid of the method according to the invention gas/liquid absorption using, for example, polyethene and polypropene hollow fibre membranes can be operated in a stable manner without any reduction in the mass transfer coefficient occurring with time, as is obtained with aqueous solutions of monoethanolamine on its own. Moreover it has been found, surprisingly, that—compared with the known monoethanolamine/water systems—the replacement of part of the monoethanolamine by a water-soluble salt does not lead to a significant reduction in the mass transfer coefficient.

The invention also relates to the use of an aqueous solution of a water-miscible organic absorbent and a water-soluble soluble salt having a surface tension of at least $60 \times 10^{-3}$ N/m at 20° C. for membrane gas absorption, and to a system for membrane gas absorption, comprising a hollow fibre membrane module containing hollow fibres of a material other than polytetrafluoroethene and a liquid comprising an aqueous solution of a water-miscible organic absorbent and a water-soluble salt, said solution having a surface tension of more than $60 \times 10^{-3}$ N/m.

In accordance with the invention, the surface tension of the liquid phase must be brought, by the addition of the water-soluble salt, at least to a value such that the liquid absorbent does not moisten the pores of the hollow fibre membranes.

For polypropene (Accurel®) the limiting value for the surface tension at room temperature is $60 \times 10^{-3}$ N/m. For other membrane materials this tension can be somewhat lower, so that with these materials somewhat lower surface tensions can also be used and this also falls within the scope of the invention.

For practical application, it is, however, preferable that the surface tension be above the critical surface tension for the membrane material, so that a stable and reliable system is obtained. Moreover, the surface tension of the liquid phase is dependent on the temperature.

Therefore, in principle, liquid absorbents or mixtures thereof below the limiting value for the surface tension cannot be used under stable conditions and/or without leakage.

Furthermore, in contrast to known systems, in the case of the invention some of the organic absorbent can be replaced by the water-soluble salt without this leading to a reduction in the kinetics. As a result, a lower concentration of the organic absorbent can be used.

However, in the case of the invention it has been found that the surface tension of the liquid phase can be increased by the addition of salts, ions or other structure-producing agents without this detracting from the kinetics.

The invention therefore makes it possible to make liquid absorbents having a low surface tension usable for membrane gas absorption by mixing with other (possibly known) absorbents which increase the surface tension. This is without out any significant adverse consequences on the reaction kinetics and/or the loading.

In this context, potassium carbonate solutions in general have much slower kinetics than solutions of monoethanolamine in water. The stability of the system depends mainly on the mass transfer coefficient. The mass transfer coefficient indicates how much material is transferred per unit time and unit surface area for a constant driving force and is therefore fore an important parameter when sizing the equipment. This coefficient must also remain constant in the case of use for a prolonged period.

Another important process parameter is the regeneration energy. Thus, whilst it is true that sodium hydroxide solution and potassium hydroxide solution give high kinetics, systems of this type demand too high a regeneration energy.

From the abovementioned article by Matsumoto et al., and from experiments carried out by the Applicant, it has been found that in experiments with regard to the $CO_2$ absorption with 5M MEA (30% in water), carried out in a hydrophobic polypropene hollow fibre membrane module, this system shows a high mass transfer coefficient ($k > 1 \times 10^{-3}$ m/s).

However, it is known from the literature reference that the mass transfer coefficient of this system decreases after some time. Moreover, research by the Applicant has shown that after some time, varying from a few hours to several days, leakage of the liquid phase occurs.

It is not entirely clear what causes this leakage. What is clear is that the leakage is not related to too low a breakthrough pressure. The term breakthrough pressure is used to refer to the pressure under which the liquid phase moistens the pores. The desired breakthrough pressure is about 1 bar, but is at least 0.5 bar. The breakthrough pressure of a 5M MEA solution is greater than 1.0 bar, the desired breakthrough pressure for a membrane system. The occurrence of leakage is also not related exclusively to the surface tension of the liquid phase, because if the surface tension of the liquid phase were too low leakage would be expected immediately on use and not after some time in continuous use.

The method of the invention has been found to be particularly suitable for the absorption of carbon dioxide from the gas phase. In this context, the water-soluble salt used is preferably a water-soluble carbonate, advantageously sodium carbonate or potassium carbonate used in a concentration of 1.5–2.5M, preferably 2M. Advantageously, the organic absorbent used is monoethanolamine in a concentration of 0.1–1.5M, preferably 1M.

Finally, the invention can also be used for desorption, in which case a gaseous component is transferred from the liquid phase to the gas phase. In general, it can be stated that both in the case of absorption of gaseous components from the gas phase and in the case of desorption an equilibrium is established between the gas phase and the liquid phase.

The invention also relates to the use of an aqueous solution of a water-miscible organic absorbent and a water-soluble salt, where said solution has a surface tension at 20° C. of more than $60 \times 10^{-3}$ N/m, in membrane gas absorption, in particular in the absorption of carbon dioxide from the gas phase, or the absorption of water vapour from the gas phase.

Finally, the invention relates to a system for membrane gas absorption, comprising a hollow fibre membrane module containing hollow fibres of a material other than polytetrafluoroethene and a container, which contains an aqueous solution of a water-miscible organic absorbent and a water-soluble salt, where said solution has a surface tension at 20° C. of more than $60 \times 10^{-3}$ N/m.

The preferences for the above application and the above system are the same as those for the above method.

B. Amino acids

According to a second preferred aspect of the invention, the liquid phase used is a solution of a water-soluble amino acid or a water-soluble salt thereof.

According to this aspect of the invention, amino acids are understood to be all organic compounds which contain one or more amino groups and one or more carboxylic acid groups or sulphonic acid groups.

In this context, the carboxylic acid/sulphonic acid group and the amino group can be bonded to the same atom of the organic compound, as in the case of naturally occurring amino acids, but this is not required according to the invention. Amino acids in which the amino group and the carboxylic acid group are separated by two or more atoms, such as carbon atoms, can advantageously be used for the invention.

For use in membrane absorption, these amino acids are subdivided into sterically hindered and non-sterically hindered amino acids, depending on the accessibility of the amino group for the compound to be absorbed.

These two categories of amino acids follow a different reaction path on absorption of carbon dioxide. In the case of non-sterically hindered amino acids, the absorption of carbon dioxide proceeds via the formation of a carbamate via the following reaction equation:

In the case of sterically hindered amino acids, the absorption of carbon dioxide proceeds via the formation of a bicarbonate in accordance with:

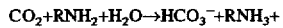

In non-sterically hindered amino acids, the amino group and the acid group will in general be separated by two or more atoms. Examples of these non-sterically hindered amino acids which are preferably used are taurate and derivatives thereof, which are described in Canadian Patent 619 193—the contents of which are incorporated herein by reference—for the absorption of carbon dioxide in absorption columns. However, said Canadian patent does not describe the use of taurine and derivatives thereof in membrane gas absorption.

The other non-sterically hindered amino acids which can be used for the present invention will be apparent to those skilled in the art; examples are, inter alia; methyltaurine, methyl-α-aminopropionic acid, N-(β-ethoxy)taurine and N-(β-aminoethyl)taurine, as described in Canadian Patent 619 193, the contents of which are incorporated herein by reference.

Examples of sterically hindered amino acids are the naturally occurring amino acids—i.e. amino acids which are natural constituents of proteins—in which acids the accessibility of the amino group to the substance to be absorbed is restricted by the presence of an amino group and a carboxylic acid group on the same carbon atom.

Examples of the above acids are, for example, alanine and glycine, as well as derivatives thereof, such as dimethylglycine. Aqueous solutions of such amino acids for use as liquid absorbent are available commercially under the trade name Alkazyd N (alanine) and Alkazyd di-K (dimethylglycine).

Furthermore, it is possible to use amino acids which contain several amino groups per molecule, such as asparagine, glutamine, lysine and histidine.

The amino acids can optionally be used in the optically active form. Further desired amino acids can be prepared via, for example, the Strecker synthesis, as will be apparent to those skilled in the art.

The sterically hindered amino acids will absorb carbon dioxide in a ratio of 1 mol of carbon dioxide per mol of amino group; in the case of non-sterically hindered amines, this ratio is 0.5:1 because of the carbamate reaction path. However, compared with sterically hindered amino acids, the non-sterically hindered amino acids offer the advantage that they, in general, display a lower bonding energy for carbon dioxide and therefore are easier to regenerate.

For the invention, the amino acid is used in an amount which is effective for absorption and the prevention of leakage, in general 0.1–10M, preferably 1–6M.

The amino acid solution will in general have an alkaline pH, more particularly a pH of 9–13. The use of an alkaline solution of the amino acid offers the advantage that the majority of the amino groups in the amino acids are available for absorption in the free form, i.e. non-protonated form.

In order to obtain the liquid absorbent, the amino acid is dissolved in water, the pH being adjusted to a desired value beforehand, during or after the addition of the amino acid. The amino acid is preferably added in the form of a water-soluble salt. For non-sterically hindered amino acids, sodium and potassium salts, more particularly potassium salts, are preferably used. Salts of this type are less desirable with sterically hindered amino acids, which absorb carbon dioxide via the bicarbonate mechanism, because a bicarbonate precipitate can form on absorption of carbon dioxide.

The amino acids can optionally be combined with other water-soluble salts, such as carbonate salts. In this case, the relative concentrations of the salts can be so chosen that an optimum combination of transfer coefficient and absorption capacity is obtained, the amino acid constituent making a greater contribution to the transfer coefficient, whilst the carbonate constituent makes a greater contribution to the absorption capacity. However, the amino acid solutions do not have to contain organic absorbents in addition to the amino acid, because the amino acid serves as the absorbent.

The surface tension of the amino acid solutions used will in general and preferably be above the limiting value of the membrane used, i.e. $60 \times 10^{-3}$ N/m at 20° C. for Accurel fibres. If desired, the surface tension of the amino acid solution can be further increased by the addition of a water-soluble salt, as mentioned above.

Further advantages of the use of amino acid solutions compared with, for example, monoethanolamine/water—in addition to preventing and/or counteracting leakage—are:

amino acids are less corrosive;

amino acids are more stable to $O_2$;

the absorption capacity is comparable to that of, for example, monoethanolamine;

the regeneration energy is comparable to that of monoethanolamine, and there is no reduction in the mass transfer coefficient with time.

The amino acid solutions in question can therefore be used for applications where the use of organic solvents or corrosive salts and combinations thereof is undesirable, such as applications at elevated temperatures higher than 70° C. For these applications the amino acid liquid phases provide a valuable alternative to the liquid phases containing organic absorbent.

The invention also relates to the use of an aqueous solution of a water-soluble amino acid or a water-soluble salt thereof in membrane gas absorption for the prevention of leakage.

Finally, the invention relates to a system for membrane gas absorption, comprising a hollow fibre membrane module containing hollow fibres of a material other than polytetrafluoroethene, and a container, which contains an aqueous solution of a water-soluble amino acid or a water-soluble salt thereof.

c. Phosphate salts

According to a third preferred aspect of the invention, the liquid phase used is an aqueous solution of a water-soluble phosphate salt.

Any water-soluble phosphate salt can be used for this purpose, sodium phosphate, potassium phosphate and ammonium phosphate, and in particular potassium phosphate, being preferred.

The phosphate salts will in general be used in a concentration which is effective in respect of the prevention or counteraction of leakage and which gives the desired absorption capacity, mass transfer and kinetics. This concentration will in general be 0.5–5M, preferably about 2M.

The phosphate salts will in general be used in alkaline solution, more particularly at a pH of 9–13. This means that the majority of the phosphate anions in this solution will be present in the $PO_4^{3-}$ form.

In order to obtain the liquid phase, the phosphate salt is dissolved in water, after which the pH is, if necessary, adjusted to a desired value. In this context it is preferable to add a phosphate salt which does not contain any $H^+$ ions, although it is also possible to add monohydrogen phosphate and dihydrogen phosphate and then to bring the pH to the desired alkaline value, the trivalent phosphate ions being obtained.

The phosphate salt used according to the invention serves as absorbent, so that it is not necessary to add any organic absorbents in addition to the phosphate salts.

The surface tension of the phosphate solutions will in general and preferably be higher than the limiting value for the membrane used, i.e. higher than $60 \times 10^{-3}$ N/m at 20° C. for, for example, Accurel fibres.

The phosphate salts used according to the invention are in particular suitable for the removal of carbon dioxide discharge streams. Another very suitable application of the phosphate salts is the removal of hydrogen sulfide from a gaseous stream, as described in U.S. Pat. No. 1,945,163— the contents of which are incorporated here by reference—in column gas absorption. However, the said patent does not describe the use of phosphate salts in membrane gas absorption.

Further advantages of the use of phosphate salts are:

phosphate salts are less corrosive;

phosphate salts are more stable to $O_2$;

the absorption capacity is comparable to that of, for example, monoethanolamine;

the regeneration energy is comparable to that of monoethanolamine, and there is no reduction in the mass transfer coefficient with time.

The invention also relates to the use of an aqueous solution of a water-soluble phosphate salt in membrane gas absorption for the prevention of leakage.

Finally, the invention relates to a system for membrane gas absorption, comprising a hollow fibre membrane module containing hollow fibres of a material other than polytetrafluoroethene, and a container, which contains an aqueous solution of a water-soluble phosphate salt.

The invention and the preferred aspects mentioned above will be explained below on the basis of the following examples, which, however, do not restrict the scope of the invention.

EXAMPLE 1

This example describes the removal of carbon dioxide from a mixture with nitrogen (6% $CO_2$) at room temperature using an aqueous solution of 1M monoethanolamine and 2M potassium carbonate, making use of porous hollow fibre membranes (Accurel®, polypropene, external diameter 1 mm, internal diameter 0.6 mm in Microdyn module LM2PO6).

During the (long-term) experiment, the liquid absorbent was pumped continuously through the lumen of the fibre at a low flow rate (0.2 l/min) and a low excess pressure on the liquid side (0.04 bar). No leakage was detected during the experiment.

Furthermore, the mass transfer coefficient was determined at three points in time during the 8-day test period. This determination was carried out by feeding the gas mixture described through the membrane module (outside the fibres) and measuring $CO_2$ concentrations at the inlet and outlet. The following table shows that the mass transfer coefficient remained constant during the test period, which signifies that no leakage took place.

TABLE 1

Mass transfer coefficient with porous polypropene hollow fibre membranes (microdyn/Accurel fibres); gas: 6% $CO_2$ in $N_2$; liquid absorbent: 1M monoethanolamine, 2M $K_2CO_3$; gas flow rate: 5 l/min.; liquid flow rate: 0.14 l/min.; liquid excess pressure: 0.04 bar.

| Day | Mass transfer coefficient $[10^{-3}$ m/s$]$ |
| --- | --- |
| 1 | 1.06 |
| 5 | 1.01 |
| 8 | 1.02 |

EXAMPLE 2

This example describes the removal of carbon dioxide from a mixture with nitrogen (6% $CO_2$) at room temperature using an aqueous solution of 2M taurine and potassium hydroxide solution added to give pH 11.68, making use of porous hollow fibre membranes (Accurel®, polypropene, external diameter 1 mm, internal diameter 0.6 mm in Microdyn module LM2PO6).

During the (long-term) experiment, the liquid absorbent was pumped continuously through the lumen of the fibre at a low flow rate (0.14 l/min) and a low excess pressure on the liquid side (0.04 bar). No leakage was detected during the experiment.

In addition, the mass transfer coefficient was determined at four points in time during the 9-day test period. This determination was carried out by feeding the gas mixture described through the membrane module (outside the fibres) and measuring $CO_2$ concentrations at the inlet and outlet. The following Table 2 shows that the mass transfer coefficient remained constant during the test period, which signifies that no leakage took place.

TABLE 2

Mass transfer coefficient with porous polypropene hollow fibre membranes (Microdyn/Accurel fibres); gas: 6% $CO_2$ in $N_2$; liquid absorbent: 2M taurine and potassium hydroxide solution added to give pH 11.68; gas flow rate 5 l/min; liquid flow 0.14 l/min; liquid excess pressure 0.04 bar.

| Day | Mass transfer coefficient $[10^{-3}$ m/s$]$ |
| --- | --- |
| 1 | 1.09 |
| 3 | 1.00 |
| 5 | 1.02 |
| 9 | 0.96 |

We claim:

1. Method for the absorption of one or more gaseous components from a gas phase in a membrane system, in that the gas phase with the component(s) to be absorbed present therein is brought into contact with a liquid phase, wherein the gas phase and the liquid phase are separated by a hydrophobic membrane, and the gaseous components are absorbed into said liquid phase through the hydrophobic membrane and then removed from the membrane system while absorbed in said liquid phase, wherein the gaseous components are chosen from carbon dioxide and/or hydrogen sulfide;

the membranes are composed of polypropene, polyethene, polyvinylidene fluoride or polysulfone;

the liquid phase comprises water and a water-miscible and/or water-soluble absorbent;

the liquid phase has a surface tension at 20° C. of more than $60 \times 10^{-3}$ N/m;

the liquid phase does not give rise to any leakage from the membrane or is effective in preventing or counteracting leakage from the membrane;

with the proviso that the liquid phase is not an aqueous solution consisting solely of monoethanolamine (MEA) and water.

2. Method according to claim 1 characterised in that the liquid phase comprises an aqueous solution of a water-soluble amino acid or a water-soluble salt thereof.

3. Method according to claim 2, characterised in that the amino acid contains a carboxylic acid group or a sulphonic acid group.

4. Method according to claim 2 characterised in that the solution of the amino acid or the salt thereof has a pH of 9-13.

5. Method according to one of claim 2, characterised in that the amino acid is present in a concentration of 0.1-10M.

6. Method according to one of claim 2, characterised in that the amino acid is a non-sterically hindered amino acid.

7. Method according to claim 6, characterised in that the amino acid is taurine or a derivative thereof.

8. Method according to one of claim 2, characterised in that the amino acid is selected from the naturally occurring amino acids.

9. Method according to one of claim 1, characterised in that the liquid phase comprises an aqueous solution of a water-soluble phosphate salt.

10. Method according to claim 9, characterised in that the solution of the water-soluble phosphate salt has a pH of 9-13.

11. Method according to claim 9, characterised in that the phosphate salt is present in a concentration of 0.5-5M.

12. A method for the absorption of one or more gaseous components from a gas phase in a membrane system, wherein the gas phase containing the component(s) to be absorbed is brought into contact with a liquid phase, wherein the gas phase and the liquid phase are separated by a hydrophobic membrane, and the gaseous components are absorbed into said liquid phase through the hydrophobic membrane and then removed from the membrane system while absorbed in said liquid phase, wherein the gaseous components are selected from the group consisting of carbon dioxide, hydrogen sulfide, and mixtures thereof;

the membranes are composed of polypropene, polyethene, polyvinylidene fluoride or polysulfone;

the liquid phase comprises water and an absorbent which is selected from the group consisting of water-miscible absorbent, water-soluble absorbents, and mixtures thereof;

the liquid phase has a surface tension at 20° C. of more than $60 \times 10^{-3}$ N/m;

the liquid phase does not give rise to any leakage from the membrane or is effective in preventing or counteracting leakage from the membrane;

with the proviso that the liquid phase is not an aqueous solution consisting solely of monoethanolamine and water and with the further proviso that the membrane is not a liquid membrane.

13. A method for absorption, in a membrane system, of at least one gaseous component from a gas phase into a liquid phase, said membrane system having at least one hydrophobic membrane permeable to said at least one gaseous component, which membrane system defining at least one gas feed channel on one side of the membrane and at least one liquid feed channel on the opposite side of the membrane, wherein the gas phase with the components to be absorbed present therein is led into the gas feed channel and brought into contact with one side of the membrane, and the liquid phase is led into the liquid feed channel and brought into contact with the opposite side of said membrane, in such a way that the at least one gaseous component is absorbed from the gas phase into the liquid phase through the hydrophobic membrane; the gas phase and the liquid phase being separated by the hydrophobic membrane, and the liquid phase containing the one or more gaseous components absorbed therein is then removed from the membrane system, wherein the gaseous components are selected from the group consisting of carbon dioxide, hydrogen sulfide, and mixtures thereof;

the membranes are made of polypropene, polyethene, polyvinylidene fluoride or polysulfone;

the liquid phase comprises water and an absorbent selected from the group consisting of water soluble absorbents, water miscible absorbents, and mixtures thereof;

the liquid phase has a surface tension at 20° C. of more than $60 \times 10^{-3}$ N/m;

the liquid phase does not leak from the membrane;

with the proviso that the liquid phase is not an aqueous solution consisting solely of monoethanolamine and water.

14. A method for absorption, in a membrane system, of at least one gaseous component from a gas phase into a liquid phase, said membrane system having at least one hydrophobic membrane permeable to said at least one gaseous component, which membrane defines at least one gas feed channel on one side of the membrane and at least one liquid feed channel on the opposite side of the membrane, wherein the gas phase with the at least one component to be absorbed present therein is led into the gas feed channel and brought into contact with one side of the membrane, and the liquid phase is led into the liquid feed channel and brought into contact with the opposite side of said membrane, in such a way that the at least one gaseous component is absorbed from the gas phase into the liquid phase through the hydrophobic membrane;

the gas phase and the liquid phase being kept separated by the hydrophobic membrane, and the liquid phase containing the at least one gaseous component absorbed therein is removed from the membrane system, wherein the gaseous components are selected from the group consisting of carbon dioxide, hydrogen sulfide, and mixtures thereof;

the membranes are made of polypropene, polyethene, polyvinylidene fluoride or polysulfone;

the liquid phase comprises water and an absorbent selected from the group consisting of water soluble absorbents, water miscible absorbents, and mixtures thereof;

the liquid phase has a surface tension at 20° C. of more than $60 \times 10^{-3}$ N/m;

the liquid phase does not leak from the membrane;

with the proviso that the liquid phase is not an aqueous solution consisting solely of monoethanolamine and water; and with the further proviso that the membrane is not a liquid membrane.

15. A method for the absorption, in a membrane system, of one or more gaseous components from a gas phase, said system having a wall surrounding a space, said space being provided with at least one hydrophobic membrane, which is permeable to said at least one gaseous component;

said at least one membrane defining, within said space, at least one liquid channel and at least one gas channel;

at least one liquid inlet and and least one liquid outlet operably connected to said at least one liquid channel;

at least one gas input and at least one gas output operably connected to said at least one gas channel; wherein a gas phase with the at least one component to be absorbed present therein is introduced via the at least one gas input into the at least one gas channel;

wherein a liquid phase is introduced into the at least one liquid channel via the at least one liquid input;

wherein in such a way that the gas phase is brought into contact with the liquid phase, and the at least one gaseous component is absorbed from the gas phase into the liquid phase through the hydrophobic membrane, the gas phase and the liquid phase being separated by the hydrophobic membrane;

wherein the liquid phase with the at least one gaseous component absorbed therein is removed from the membrane system via the at lease one liquid output, and the gas phase, from which the at least one gaseous component is at least partially removed, is removed from the reactor via the at least one gas outlet, wherein the gaseous components are selected from the group consisting of carbon dioxide, hydrogen sulfide, and mixtures thereof;

the membranes are made of polypropene, polyethene, polyvinylidene fluoride or polysulfone;

the liquid phase comprises water and an organic absorbent selected from the group consisting of water soluble absorbents, water miscible absorbents, and mixtures thereof;

the liquid phase has a surface tension at 20° C. of more than $60 \times 10^{-3}$ N/m;

the liquid phase does not leak from the membrane;

with the proviso that the liquid phase is not an aqueous solution consisting solely of monoethanolamine and water.

16. Method according to claim 15, wherein the liquid phase contains a water-soluble salt which is selected from water-soluble carbonates.

17. A method according to claim 16 wherein the water-soluble carbonate is selected from the group consisting of potassium carbonate and sodium carbonate.

18. Method according to claim 15, characterised in that the organic absorbent is selected from monoethanolamine, diethanolamine (DEA), methyldiethanolamine (MDEA), methyl ethyl ketone (MEK), methyl isobutyl ketone (MBK), (poly)ethene glycols, ethers, alcohols and N-methylpyrrolidone.

19. Method according to one of claims 15, characterised in that the organic absorbent is used in a concentration of 0.05–10M.

20. Method according to claim 15, wherein the liquid phase contains a salt, which is used in a concentration of 0.05–10M.

21. Method according to claim 15, wherein the liquid phase contains a salt and said salt is a water-soluble carbonate and the organic absorbent used is a monoethanolamine.

22. A method according to claim 21 wherein the water-soluble carbonate is selected from the group consisting of potassium carbonate and sodium carbonate.

23. Method according to claim 15, wherein a water-soluble carbonate is present in the liquid phase in a concentration of 1.5–2.5M and the monoethanolamine is used in a concentration of 0.5–1.5M.

* * * * *